(12) United States Patent
Buerkle et al.

(10) Patent No.: US 8,364,341 B2
(45) Date of Patent: Jan. 29, 2013

(54) METHOD FOR CONTROLLING A DRIVER ASSISTANCE SYSTEM

(75) Inventors: Lutz Buerkle, Leonberg (DE); Tobias Rentschler, Pforzheim (DE); Thomas App, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 401 days.

(21) Appl. No.: 12/733,641

(22) PCT Filed: Jul. 22, 2008

(86) PCT No.: PCT/EP2008/059562
§ 371 (c)(1),
(2), (4) Date: Jun. 24, 2010

(87) PCT Pub. No.: WO2009/037029
PCT Pub. Date: Mar. 26, 2009

(65) Prior Publication Data
US 2010/0286866 A1    Nov. 11, 2010

(30) Foreign Application Priority Data

Sep. 14, 2007  (DE) .......................... 10 2007 043 911

(51) Int. Cl.
*G01M 17/00* (2006.01)

(52) U.S. Cl. ..................................... 701/33.4

(58) Field of Classification Search ................. None
See application file for complete search history.

(56) References Cited

U.S. PATENT DOCUMENTS

| 6,580,986 B1 * | 6/2003 | Uenuma et al. ............... 701/41 |
| 2004/0186651 A1 | 9/2004 | Tange et al. |

FOREIGN PATENT DOCUMENTS

| DE | 197 20 626 | 12/1997 |
| DE | 101 37 292 | 3/2003 |
| EP | 1 074 904 | 2/2001 |
| EP | 1074904 A1 * | 2/2001 |
| EP | 1 674 361 | 6/2006 |
| EP | 1 674 375 | 6/2006 |
| GB | 2 095 350 | 9/1982 |
| WO | WO 03/013940 | 2/2003 |

* cited by examiner

*Primary Examiner* — James Trammell
*Assistant Examiner* — Michael D Lang
(74) *Attorney, Agent, or Firm* — Kenyon & Kenyon LLP

(57) ABSTRACT

In a method for controlling a driver assistance system, the activation of LKS (lane keeping support) function may result in lateral pendulum motions of the vehicle. Zones having specified conditions are defined in a region of the traffic lane in front of the vehicle. Within the zones, a check is performed to determine whether the respective driving state of the vehicle matches the specified conditions. In the event of a match, the existence of a pendulum motion of the vehicle is assumed.

16 Claims, 3 Drawing Sheets

METHOD FOR CONTROLLING A DRIVER ASSISTANCE SYSTEM

BACKGROUND OF THE INVENTION

1. Field of the Invention

The present invention relates to a method for controlling a driver assistance system.

2. Description of Related Art

An assistance function for a lane departure warning (LDW), in which the driver of a motor vehicle is warned acoustically or haptically against leaving the traffic lane, has in the meantime become commercially available, especially in the commercial vehicle sector. In addition to this assistance function, a steering assistance function (LKS=lane keeping support) is also known from the following articles, which actively supports the driver in maintaining the vehicle in the traffic lane by directed guiding torques.

In a driver assistance system having an LKS assistance function of the kind mentioned at the outset, an essentially stable lateral pendulum motion of the vehicle within the traffic lane may result. This pendulum motion results from the fact that the LKS assistance function intervenes when the vehicle approaches the edges of the corridor defined around a reference or setpoint trajectory in order to keep the vehicle in the lane. The reference or setpoint trajectory may be the center of the traffic lane for example.

Published German patent document DE 101 37292 A1 describes a method for operating a driver assistance system of a vehicle, particularly of a motor vehicle, having a servo-supported steering system, including the following method steps:

- acquiring or estimating surroundings data, preferably of a current traffic situation,
- acquiring or estimating preferably current motion data of the vehicle,
- comparing the acquired or estimated surroundings data to the motion data of the vehicle,
- modifying the support of a steering handle in accordance with the comparison.

Published German patent document DE 197 20 626 A1 describes a driving state monitoring device for a motor vehicle, which is used to monitor the driving state of a driver of the vehicle. The behavior of the vehicle and/or a driving operation of the driver and/or at least one state of the driver are detected in order thereby to generate driving state display data, which indicate the driving state of the driver. On the basis of the generated driving state display data, a determination is made as to whether the driving state of the driver is abnormal. If no determination is made that the driving state of the driver is abnormal, a measure of the normality of the driving state of the driver is determined by entering a plurality of individual data of the driving state display data into a neutral network. A warning is issued and/or the vehicle is controlled as a function of a result of the determination whether the driving state of the driver is abnormal and the measure of normality of the driving state of the driver.

BRIEF SUMMARY OF THE INVENTION

In accordance with the present invention, the control of a driver assistance system having an assistance function supporting the lateral guidance of the vehicle, such as LKS (lane keeping support) in particular, is improved further. In particular, a pendulum motion of the vehicle caused by interventions of the LKS assistance function will be detected as quickly as possible and with little effort since the detection of such a pendulum motion is an important element for triggering various system-internal functions, for estimating properties of the traffic lane and/or operating states of the vehicle, or also for calibrating the driver assistance system, in particular the LKS assistance function.

A lateral pendulum motion of the vehicle is associated with a change in the lateral deviation of the vehicle from the center of the traffic lane and a change of the differential angle between the direction of travel of the vehicle and the course of the traffic lane. By measuring the lateral deviation and the differential angle and by the processing according to the present invention, a pendulum motion of the vehicle may be detected very quickly.

The method provided according to the present invention for detecting a lateral pendulum motion of a vehicle supported by an LKS function is very quick and conserves resources such as run time, measuring time and memory capacity. Compared to a method based on a Fourier analysis, which requires the acquisition of numerous measured values and a subsequent Fourier transform, a pendulum motion may be detected after a comparatively short period and without protracted measurements. In practice, less than a single oscillation period already suffices in order to detect the occurrence of a pendulum motion reliably. The very short detection time then also allows for a very quick intervention in order to attenuate for example an overly great and disruptive pendulum motion by an intervention in systems of the vehicle.

DETAILED DESCRIPTION OF THE INVENTION

Figure 1:
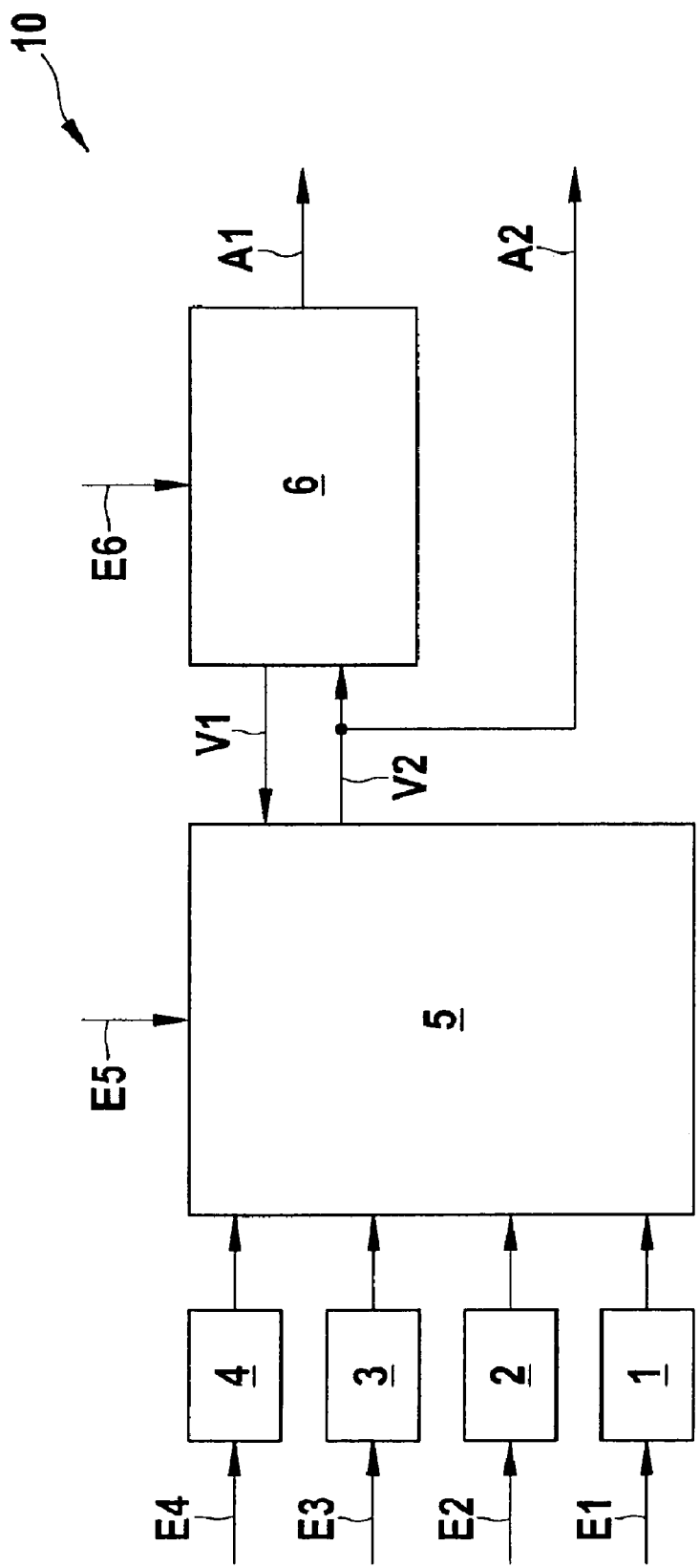
FIG. 1 shows a block diagram of a driver assistance system.

The present description of the invention assumes that a driver assistance system having a lane detection function, in particular a video-based lane detection function, is situated in a vehicle. The lane detection function makes it possible to detect the relative vehicle position within the traffic lane. The invention described here requires the availability of the processed (if necessary filtered) variables such as the lateral vehicle deviation from a reference trajectory, for example the center of the traffic lane, the differential angle between the longitudinal axis of the vehicle and the reference trajectory, and the curvature of the trajectories, for example the curvature of the traffic lane. Likewise, various driving-dynamic variables of the vehicle are required such as in particular the longitudinal speed of the vehicle and the steering wheel torque applied by the driver. FIG. 1 shows a block diagram of a driver assistance system 10, which is controllable in accordance with the present invention. Driver assistance system 10 comprises first a function module 5 for detection. Function module 5 is connected to another function module 6 for action. Function modules 5 and 6 comprise multiple input terminals E1 through E5 and E6. Input terminal E1 is connected to function module 5 via a filter 1. The steering wheel torque detected by an appropriate sensor is supplied to function module 5 via input terminal E1. Input terminal E2 is connected to function module 5 via a filter 2. The curvature of the trajectory, which may match the curvature of the traffic lane for example, is supplied to function module 5 via input terminal E2. Input terminal E3 is connected to function module 5 via a filter 3. The differential angle between the longitudinal axis of the vehicle and the reference trajectory, for example in the direction of the traffic lane, is supplied to function module 5 via input terminal E3. Input terminal E4 is connected to function module 5 via a filter 4. The lateral deviation of the vehicle from the reference trajectory, for example the center of the traffic lane, is supplied to function module 5 via input terminal E4. The speed of the vehicle is supplied to function module 5 via input terminal E5. Additional performance characteristics such as system deviations of the LKS controller are supplied to function module 6 via input terminal E6. Function modules 5 and 6 are connected to each other via connecting lines V1 and V2. Reference numeral A1 indicates an output terminal of function module 6, while reference numeral A2 indicates an output terminal of function module 5.

Figure 2:
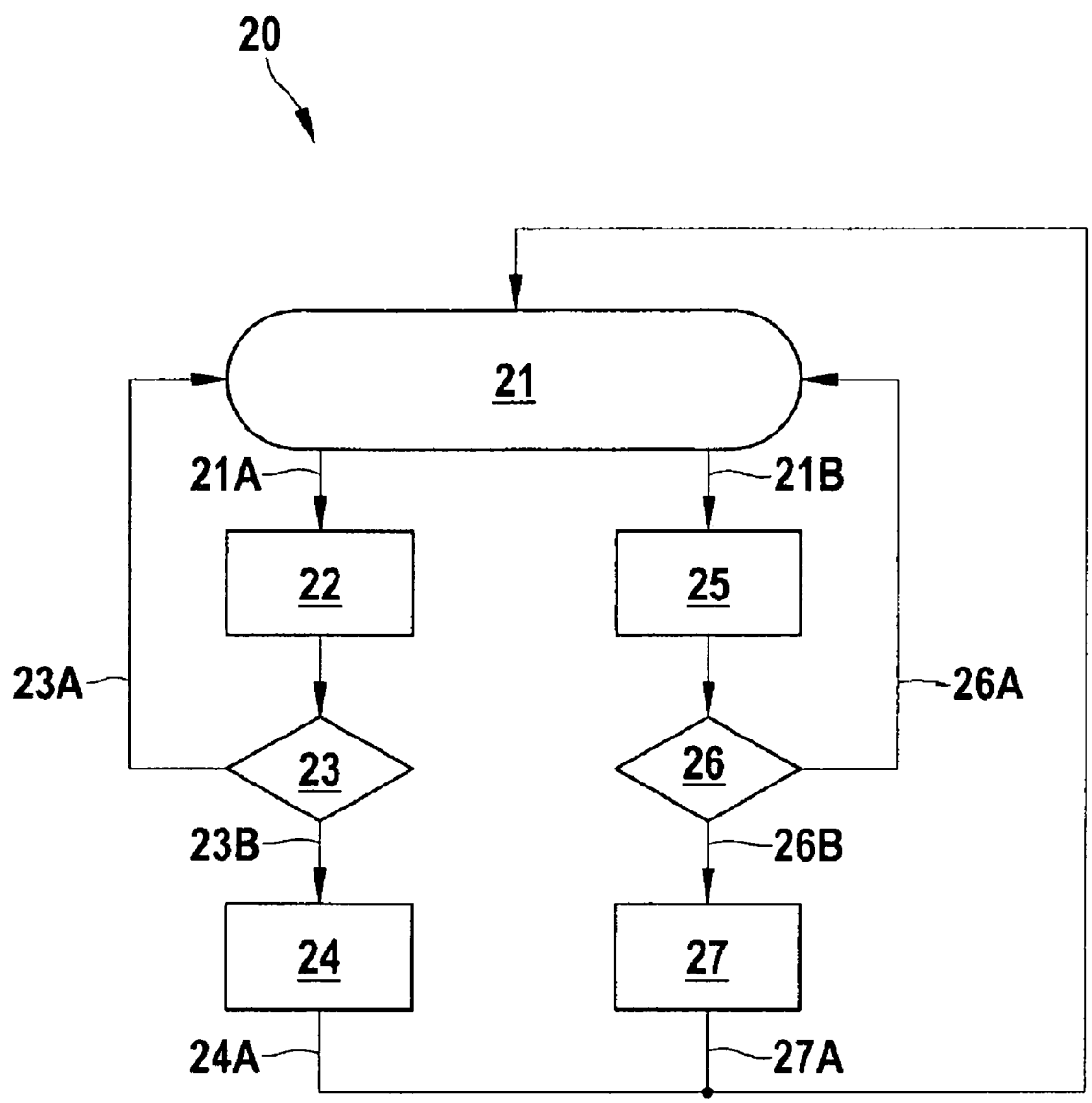
FIG. 2 shows a flow chart of a method according to the present invention.
Figure 3:
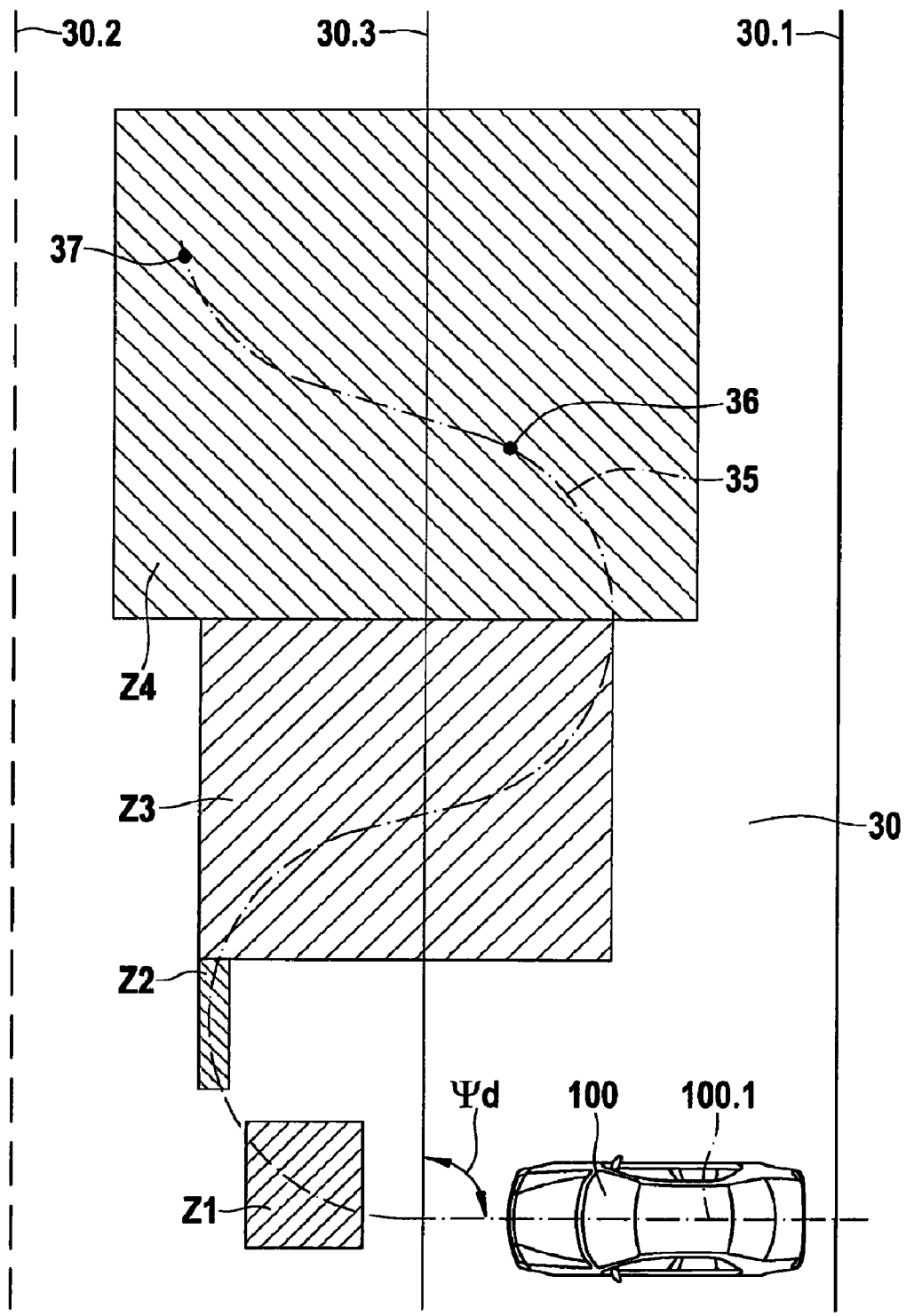
FIG. 3 shows a top view of a road space for illustrating the present invention.

An example embodiment of the present invention is explained in more detail in the following with reference to FIG. 2 and FIG. 3. FIG. 2 shows a flow chart 20, which will be explained further below. In the following, reference is first made to FIG. 3, which shows the top view of a road space 300 having a traffic lane 30 bounded by traffic lane markers 30.1 and 30.2. Vehicle 100, equipped with driver assistance system 10, moves along trajectory 35 on traffic lane 30. The center of traffic lane 30, which when activating the LKS function of the driver assistance system ideally also corresponds to the reference trajectory of vehicle 100, is indicated by reference numeral 30.3. A region of traffic lane 30 in front of vehicle 100 in the direction of travel is subdivided into zones Z1, Z2, Z3, Z4. Zone Z1 is located directly in front of vehicle 100, while zone Z4 is furthest removed from vehicle 100. A great time advantage of the design approach according to the present invention is that in zone Z1 the direction of motion of the vehicle to the left or to the right is evaluated from the available current motion of vehicle 100 and thus a quick starting point is found for beginning the detection of a pendulum motion of vehicle 100. Vehicle 100 must pass zones Z1 through Z4 sequentially in order for a pendulum motion to be detected. The following conditions apply to zones Z1 through Z4.:

Zone Z1:

Zone Z1 is based on an interval of the lateral deviation of vehicle 100. Because of the robustness of the method of the present invention with respect to noise influences for example, the boundary of zone Z1 should not lie at the center of the traffic lane. Vehicle 100 must be located in this zone Z1 so that a starting point is set in function module 5 for detecting a pendulum motion of vehicle 100. An oscillation or pendulum motion of vehicle 100 begins with a motion of vehicle 100 toward the left if the following condition is satisfied:

$$-Y_{limit} > Y > -2 \cdot Y_{limit} \quad (1)$$

An oscillation or pendulum motion of vehicle 100 begins with a motion of vehicle 100 toward the right if the following condition is satisfied:

$$Y_{limit} < Y < -2 \cdot Y_{limit} \quad (2)$$

Zone Z2:

In zone Z2, the absolute value $|\Psi_d|$ of the differential angle $\Psi_d$ between the longitudinal axis 100.1 of the vehicle and the direction of traffic lane 30 or the direction of its center 30.3 must fall below a defined limit $\Psi_{limit}$. That is, the following condition must hold:

$$|\Psi_d| < \Psi_{limit} \quad (3)$$

When reaching this limit, the lateral deviation $Y_{zone\ 2}$ existing at that time is stored.

Zone Z3:

In zone Z3, the three criteria described in the following are evaluated. First, condition (3) must again be satisfied. That is, the differential angle between the longitudinal axis of the vehicle and the direction of the traffic lane must fall below a defined limit.

Furthermore, the lateral deviation existing at that point relative to the lateral deviation $Y_{zone\ 2}$ ascertained in zone Z2 must have reached a deviation difference of at least $dY_{zone\ 3}$. Finally, the two previously mentioned conditions must be achieved within a specifiable time period $\Delta T1$, which is specified for zone Z3. If this is not the case, that is, if the specified time period $\Delta T1$ is exceeded without the two previously mentioned conditions being satisfied, then the present detection process is aborted without result and a new detection process is started using the conditions defined for zone Z1.

Zone Z4:

In zone Z4, for example at point 36, a pendulum motion of vehicle 100 is detected if the conditions prescribed for zone Z3 were satisfied and additionally at this point 36 one of the following conditions, in relation to the initial direction in zone Z1, is satisfied:

$$\text{left: } Y < Y_{limit} \text{ or} \quad (4)$$

$$\text{right: } Y > -Y_{limit} \quad (5)$$

The information or operating state "pendulum motion detected" is generated by function module 5 if all of the aforementioned conditions for all zones Z1 through Z4 are satisfied. This information is passed on to function module 6 via connecting line V2 and is also provided on output terminal A2. This operating state is maintained until function module 6 resets the detection process and defines the condition for the start of a new detection process in a zone Z1.

Via output terminal A1, function module 6 controls measures that are to be initiated as an action in response to the detected lateral pendulum motion. This may be an intervention in the steering system of vehicle 100 in the context of an LKS assistance function of driver assistance system 1 of the vehicle, for example. It is not necessary that this action be initiated immediately after detecting a pendulum motion of vehicle 100, but rather it may be additionally subject to other criteria. An example is the activation of an intervention for suppressing another vehicle oscillation. Advantageously, following the detection of a pendulum motion of the vehicle, such an intervention is performed only when the differential angle has fallen to a smallest possible value, preferably the value zero. This is the case approximately at point 37 in FIG. 3. The duration of the required intervention is advantageously made to depend on the speed of the vehicle and is determined by function module 6. Function module 6 also determines how long the detected operating state is maintained and transmits this information to function module 5 via connecting line V1.

The following description refers in particular to the flow chart shown in FIG. 2. The present invention is based on the fact that a lateral pendulum motion of vehicle 100 may occur only in a vehicle that is traveling. The longitudinal speed of vehicle 100 should thus be greater than the value zero. Advantageously, in one specific embodiment of the present invention, a minimum speed may therefore be specified as a limiting value. Above this limiting value, the present invention is applicable. In order to prevent the effect of the centrifugal force on the vehicle when cornering from falsely indicating a pendulum motion of the vehicle in the sense of the present invention, the present invention is suitably applied only in a traffic lane that is essentially straight. A limiting value is therefore advantageously specified for the curvature of the traffic lane. The present invention is applied only when the curvature is below this limiting value. Since the present invention is to be used to detect only pendulum motions of the vehicle caused by the intervention of an assistance function of the driver assistance system, in particular the LKS function, the steering wheel torque of the driver is suitably monitored as well. This excludes the possibility that a detected pendulum motion is one that is caused by a conscious intervention of the driver in the steering behavior of the vehicle. If the three mentioned conditions are satisfied, the detection of a possible pendulum motion is started with step 21 (FIG. 2). For this purpose, first a check is performed to determine whether the conditions defined for zone Z1 obtain or not, a distinction being made as well as to whether the pendulum motion of vehicle 100 begins with a motion of the vehicle to the left (step 21A) or to the right (step 21B). If the pendulum motion begins with a motion to the left, this is followed by step 21A, which transitions to step 22. In step 22, a check is performed as to whether the conditions defined for zone Z2 are satisfied. If this is the case, the lateral deviation detected in the process is stored and a transition to step 23 is made. In step 23, a check is performed as to whether the conditions defined for zone Z4 are satisfied. If this is not the case, and if in particular the specified time limit is not maintained, then the process is aborted for the moment (step 23A) and, following a return to initial step 21, it is started again if indicated. On the other hand, if the conditions defined for zone Z3 are satisfied, then in the region of zone Z4 a determination is first made (step 24) that a pendulum motion has been detected (see point 36 in FIG. 3). If required and provided, an intervention in systems of the vehicle 100 (point 37 in FIG. 3) may then be additionally performed with the aid of function module 6. After a successful conclusion of the described process steps, step 24A returns to the starting point, that is, to step 21. An analogous sequence is followed with steps 21, 21B, 25, 26, 26A, 26B, 27, 27A if the pendulum motion of vehicle 100 is initiated with a motion to the right.

What is claimed is:

1. A method for detecting a lateral pendulum motion of a vehicle resulting from an activation of an automated lane-keeping-support function of a driver assistance system, comprising:
defining multiple zones in a region of a traffic lane in front of the vehicle, wherein each zone has at least one associated predetermined condition relating to a driving state of the vehicle;
performing, by a processor, a check within each zone to determine whether the driving state of the vehicle matches the at least one predetermined condition associated with the respective zone, wherein the pendulum motion of the vehicle deemed to exist if the respective predetermined condition is satisfied for each of the zones.

2. The method as recited in claim 1, wherein, in a first zone directly in front of the vehicle, a check is performed to determine whether, and in what direction, the vehicle is moving away from a predetermined reference trajectory.

3. The method as recited in claim 2, wherein,
in the event of a movement of the vehicle to the left of the reference trajectory, a detection starting point is set if the following condition (1) is satisfied:

$$-Y_{limit} > Y > -2 \cdot Y_{limit} \quad (1)$$

wherein Y is the lateral deviation of the vehicle and $Y_{limit}$ is a limiting value of the lateral deviation of the vehicle.

4. The method as recited in claim 2, wherein,
in the event of a movement of the vehicle to the right of the reference trajectory, a detection starting point is set if the following condition (2) is satisfied:

$$Y_{limit} < Y < -2 \cdot Y_{limit} \quad (2)$$

where in Y is the lateral deviation of the vehicle and $Y_{limit}$ is a limiting value of the lateral deviation of the vehicle.

5. The method as recited in claim 2, wherein a limiting value of a differential angle is predefined, wherein the differential angle is an angle between the direction of travel of the vehicle and the direction of the reference trajectory, and wherein in a second zone directly adjacent to the first zone the following are performed: (a) the differential angle is measured, and (b) subsequently it is determined whether the absolute value of the measured differential angle is below the predefined limiting value.

6. The method as recited in claim 5, wherein if the absolute value of the measured differential angle is below the predefined limiting value, the lateral deviation of the vehicle obtained in the second zone is stored.

7. The method as recited in claim 6, further comprising:
in a third zone, determining whether the absolute value of a measured differential angle is below the predefined limiting value;
if the absolute value of the measured differential angle is below the predefined limiting value, detecting the lateral deviation of the vehicle obtained in the third zone;
comparing the lateral deviation detected in the second zone and the lateral deviation obtained in the third zone; and
determining whether the difference between the lateral deviations detected in the second and third zones is below a predefined differential limiting value.

8. The method as recited in claim 7, further comprising:
specifying a time interval for the detection of a lateral pendulum motion of the vehicle, wherein the detection process is aborted if no pendulum motion is detected within the predefined time interval.

9. The method as recited in claim 7, further comprising:
detecting the speed of the vehicle; and
initiating the detection of a lateral pendulum motion of the vehicle only if the speed of the vehicle exceeds a predefined minimum speed.

10. The method as recited in claim 7, further comprising:
specifying a limiting value of a curvature of the reference trajectory;
detecting the curvature of the reference trajectory; and
initiating the detection of a lateral pendulum motion of the vehicle only if the absolute value of the curvature of the reference trajectory is below the specified limiting value of the curvature of the reference trajectory.

11. The method as recited in claim 7, further comprising:
specifying a limiting value of a steering torque;
detecting the steering torque; and
initiating the detection of a lateral pendulum motion of the vehicle only if the detected steering torque is not caused by an intervention of the driver.

12. The method as recited in claim 7, further comprising:
detecting a differential angle between the driving direction of the vehicle and the reference trajectory; and
following the detection of a lateral pendulum motion of the vehicle, performing an intervention in at least one on-board system of the vehicle to attenuate the lateral pendulum motion if the differential angle between the driving direction of the vehicle and the reference trajectory is below a specified limit value.

13. The method as recited in claim 12, wherein the intervention in at least one on-board system of the vehicle is performed if the differential angle between the driving direction of the vehicle and the reference trajectory is zero.

14. The method as recited in claim 12, wherein the duration of the intervention in at least one on-board system of the vehicle is determined as a function of the speed of the vehicle.

15. The method as recited in claim 13, wherein the intervention lasts for a predetermined time.

16. A device for detecting a lateral pendulum motion of a vehicle resulting from an activation of an automated lane-keeping-support function of a driver assistance system, comprising:

a means for defining multiple zones in a region of a traffic lane in front of the vehicle, wherein each zone has at least one associated predetermined condition relating to a driving state of the vehicle; and a means for performing a check within each zone to determine whether the driving state of the vehicle matches the at least one predetermined condition associated with the respective zone, wherein the pendulum motion of the vehicle deemed to exist if the respective predetermined condition is satisfied for each of the zones.

* * * * *

UNITED STATES PATENT AND TRADEMARK OFFICE
CERTIFICATE OF CORRECTION

PATENT NO. : 8,364,341 B2  Page 1 of 1
APPLICATION NO. : 12/733641
DATED : January 29, 2013
INVENTOR(S) : Buerkle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 502 days.

Signed and Sealed this
First Day of September, 2015

Michelle K. Lee
*Director of the United States Patent and Trademark Office*